(12) United States Patent
Walters et al.

(10) Patent No.: US 11,755,552 B2
(45) Date of Patent: Sep. 12, 2023

(54) METHOD AND SYSTEM FOR IMPLEMENTING A FAST DATASET SEARCH USING A COMPRESSED REPRESENTATION OF A PLURALITY OF DATASETS

(71) Applicant: Capital One Services, LLC, McLean, VA (US)

(72) Inventors: Austin Walters, Savoy, IL (US); Mark Watson, Philadelphia, PA (US); Anh Truong, Champaign, IL (US); Reza Farivar, Champaign, IL (US); Vincent Pham, Champaign, IL (US); Kate Key, Powhatan, VA (US); Galen Rafferty, Mahomet, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 3 days.

(21) Appl. No.: 17/528,607

(22) Filed: Nov. 17, 2021

(65) Prior Publication Data
US 2023/0153284 A1    May 18, 2023

(51) Int. Cl.
*G06F 16/22* (2019.01)
*G06F 16/2457* (2019.01)
*G06F 16/2455* (2019.01)

(52) U.S. Cl.
CPC .... *G06F 16/2228* (2019.01); *G06F 16/24558* (2019.01); *G06F 16/24578* (2019.01)

(58) Field of Classification Search
CPC ........... G06F 16/2228; G06F 16/24558; G06F 16/24578
See application file for complete search history.

(56) References Cited

U.S. PATENT DOCUMENTS

| | | | |
|---|---|---|---|
| 8,429,153 B2 | 4/2013 | Birdwell et al. | |
| 2007/0286528 A1* | 12/2007 | Podilchuk | G06F 16/78 707/E17.03 |

(Continued)

OTHER PUBLICATIONS

Deng et al., "Table2Vec: Neural Word and Entity Embeddings for Table Population and Retrieval", SIGIR '19, Jul. 21-25, 2019, Paris, France.

(Continued)

*Primary Examiner* — Allen S Lin
(74) *Attorney, Agent, or Firm* — GREENBERG TRAURIG, LLP

(57) ABSTRACT

A method includes storing, by one or more processors of one or more computing devices, a plurality of datasets in a non-transitory computer memory associated with the one or more computing devices. A plurality of index representations is generated where each one of the plurality of index representations includes a compressed representation of a respective one of the plurality of datasets. The plurality of index representations is stored in the non-transitory computer memory. A sample dataset is received by the one or more processors. A sample dataset representation is generated that includes a compressed representation of the sample dataset. A determination that at least one of the plurality of datasets is most similar to the sample dataset based on the sample dataset representation and the plurality of index representations is performed.

20 Claims, 9 Drawing Sheets

(56) References Cited

U.S. PATENT DOCUMENTS

| | | | | |
|---|---|---|---|---|
| 2012/0246324 | A1* | 9/2012 | Kan | G06F 11/3433 |
| | | | | 718/102 |
| 2016/0034525 | A1* | 2/2016 | Neels | G06F 16/285 |
| | | | | 707/737 |
| 2018/0285457 | A1* | 10/2018 | Pulbere | G06F 16/24578 |
| 2019/0064788 | A1* | 2/2019 | Komatsuda | G06F 11/3082 |
| 2019/0317961 | A1* | 10/2019 | Brener | G06F 16/9035 |

OTHER PUBLICATIONS

Despois, Latent space visualization—Deep Learning bits #2; Hacker Noon, Feb. 23, 2017 retrieved Dec. 18, 2020 <<https://hackermoon.com/latent-space-visualization-deep-learning-bits-2-bd09a46920df>>.

* cited by examiner

METHOD AND SYSTEM FOR IMPLEMENTING A FAST DATASET SEARCH USING A COMPRESSED REPRESENTATION OF A PLURALITY OF DATASETS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to database management, and more specifically to a method and system for implementing a fast dataset search using a compressed representation of a plurality of datasets.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that may include at least the following steps of storing, by one or more processors of one or more computing devices, a plurality of datasets in a non-transitory computer memory associated with the one or more computing devices. A plurality of index representations may be generated, by the one or more processors, where each one of the plurality of index representations may include a compressed representation of a respective one of the plurality of datasets. The plurality of index representations may be stored, by the one or more processors, in the non-transitory computer memory. A sample dataset may be received by the one or more processors. A sample dataset representation may be generated by the one or more processors that may include a compressed representation of the sample dataset. At least one of the plurality of datasets is most similar to the sample dataset based on the sample dataset representation and the plurality of index representations may be determining by the one or more processors.

In some embodiments, the present disclosure provides an exemplary technically improved computer-based system that may include at least the following components of a non-transitory computer memory and at least one processor coupled to the non-transitory computer memory. The at least one processor may be configured to receive a sample dataset, to generate a sample dataset representation comprising a compressed representation of the sample dataset, and to determine that at least one of a plurality of datasets is most similar to the sample dataset based on the sample dataset representation and a plurality of index representations. Each one of the plurality of index representations may include a compressed representation of a respective one of the plurality of datasets.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
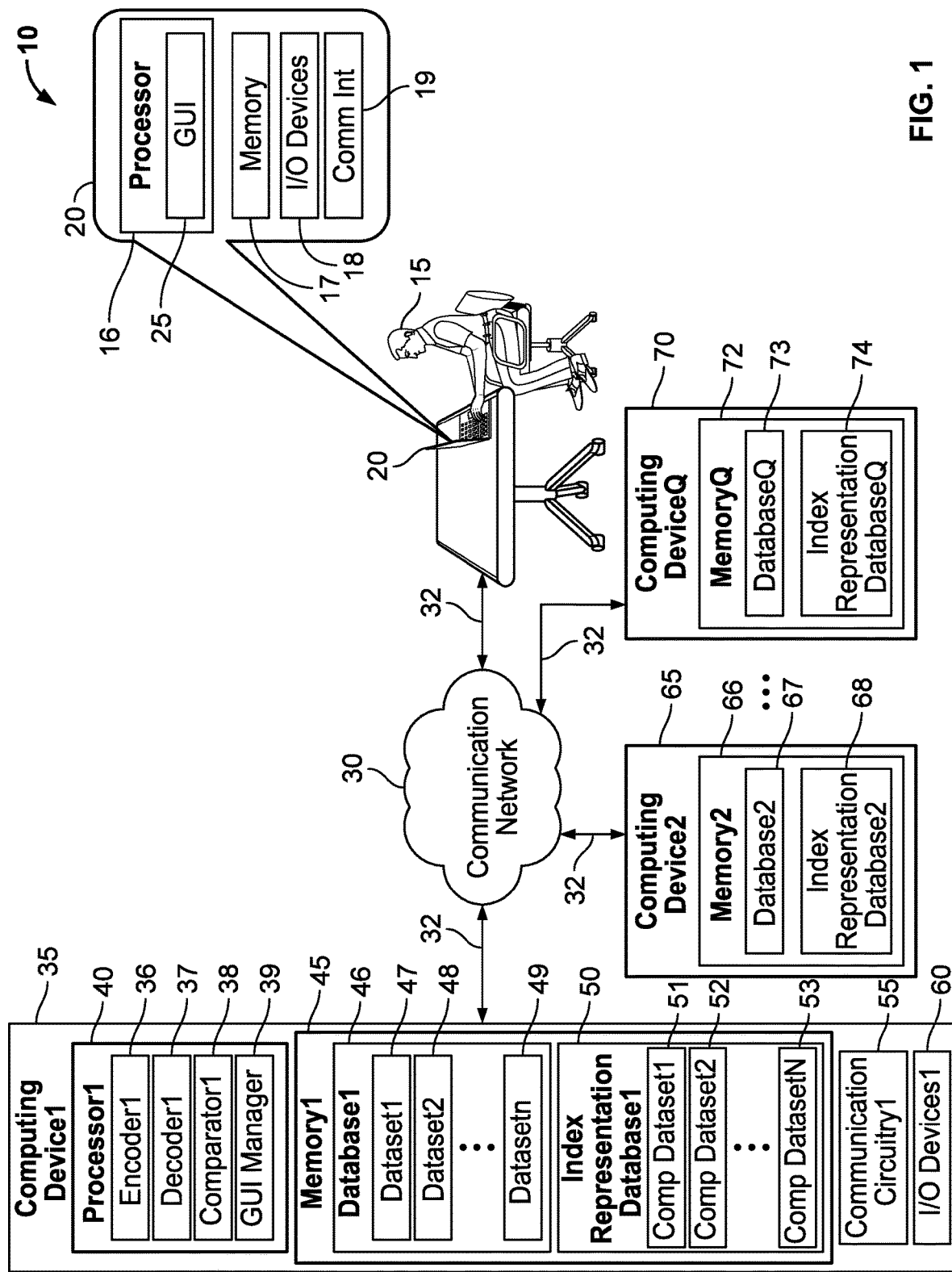
FIG. 1 depicts a block diagram of a system for implementing a fast dataset search using a compressed representation of a plurality of datasets in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In many instances, a user may use a sample dataset for a variety of applications that was taken from and/or related to a large initial dataset. For example, the sample dataset may be used to train a machine learning model and the user may then need more data from the initial dataset to further refine the machine learning model. However, the user may not know the location of the initial dataset in a database. Searching the entire database to identify the initial dataset from the same dataset may be very cumbersome, long, and computationally inefficient.

Embodiments of the present disclosure herein disclose a method and system for implementing a fast dataset search using a compressed representation of a plurality of datasets. A plurality of datasets may be mapped into a compressed representation such as a latent space representation which converts each dataset to a compressed dataset with a smaller data size than the original dataset.

In some embodiments, in order to identify the initial dataset from a plurality of datasets, the sample dataset may be mapped into the compressed representation. The compressed representation of the sample dataset may then be compared to the compressed representation of each dataset in the plurality of datasets so as to determine which dataset from the plurality of datasets is most similar to the sample dataset as described herein. In this manner, the use of the compressed representations in identifying the initial dataset from the plurality of datasets saves computation time and increases computational efficiency.

FIG. 1 depicts a block diagram of a system 10 for implementing a fast dataset search using a compressed representation of a plurality of datasets in accordance with one or more embodiments of the present disclosure. System 10 may include a computer 20 associated with a user 15 and displaying a graphic user interface (GUI) 25 to the user 15. The computer 20 may communicate 32 over a communication network 30 with any of Q computing devices, where Q is an integer represented by a computing device1 35, a computing device2 65, . . . , a computing deviceQ 70. Computing Device1 35 may include a processor1 40, a memory1 45, a communication circuitry1 55 for communicating 32 over the communication network 30, and input/output (I/O) devices1 60. The Memory1 45 may store a Database1 46 with a plurality of n datasets where n is an integer as denoted a Dataset1 47, a Dataset2 48, . . . , a Datasetn 49, and an Index Representation Database1 50 with a plurality of N compressed datasets where N is an integer as denoted a Comp Dataset1 51, a Comp Dataset2, 52, . . . , a Comp DatasetN 53.

In some embodiments, the Database1 46 may use PostgreSQL and/or MySQL database management, for example.

In some embodiments, the processor 1 40 may be configured to execute software modules such as an Encoder1 36, a Decoder1 37, a Comparator1 38, and a GUI Manager 39 for sending instructions over the communication network 30 to the GUI 25 of the computer 20 for controlling what is displayed to the user 15.

In some embodiments, each of the Q computing devices: the computing device 2 65, . . . , the computing deviceQ 70 may respectively include a memory 2 66, . . . , a memoryQ 72. Furthermore, each of the Q computing devices may respectively include a processor, a communication circuitry for communicating 32 over the communication network 30, and input and output (I/O) devices which are not shown in FIG. 1 for brevity. The memory2 66 may store a Database2 67 with a plurality of datasets (not shown but similar to that shown in Database1 46) and an Index Representation Database2 68 with a plurality of compressed datasets (not shown but similar to that shown in Index Representation Database1 50). The memoryQ 72 may store a DatabaseQ 73 with a plurality of datasets (not shown but similar to that shown in Database1 46) and an Index Representation DatabaseQ 74 with a plurality of compressed datasets (not shown but similar to that shown in Index Representation Database1 50).

It should be noted that the methods disclosed herein may be performed by any of the Q computing devices. Thus, any function performed by the Processor1 40 may be performed by a Processor2 (not shown) on Computing Device2 65, . . . , a ProcessorQ (not shown) on Computing DeviceQ 70.

In some embodiments, the computer 20 associated with the user 15 may include a processor 16, a memory 17, a communication circuitry and interface 19 for communicating 32 over the communication network 30, and input and output (I/O) devices 18.

Figure 2:
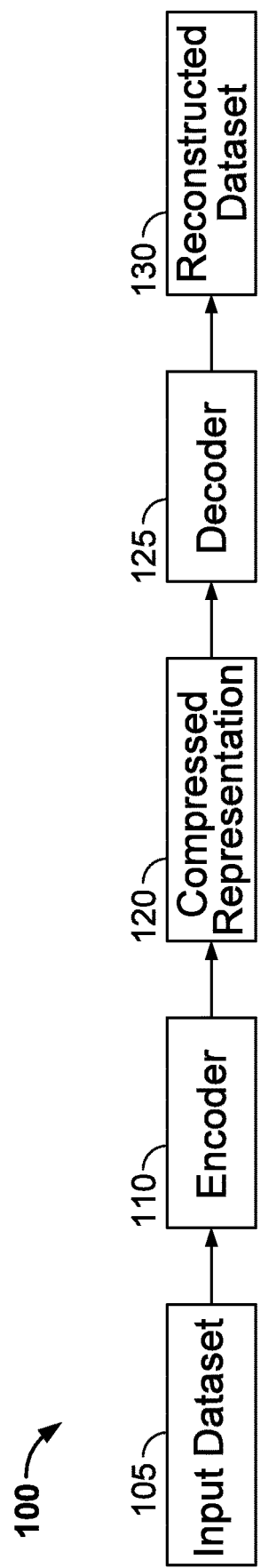
FIG. 2 depicts a block diagram for compressing data in accordance with one or more embodiments of the present disclosure.

FIG. 2 depicts a block diagram 100 for compressing data in accordance with one or more embodiments of the present disclosure. An input dataset 105 may be inputted into an encoder 110. Note that the Encoder 110 and the Encoder1 36 of FIG. 1 may be used interchangeably herein. The encoder 110 may convert the input dataset 105 into a smaller dataset representation as a compressed representation 120, for example. The encoder 110 may apply a latent space transformation or a principal components analysis, for example, to the input dataset 105 resulting in a smaller compressed instance of the input dataset 105 that is related to the original input dataset.

In some embodiments, the encoder 110 may be a machine learning model such as an auto-encoder. Similarly, the decoder 125 may also be a machine learning model.

In some embodiments, the compressed representation 120 of the dataset may be converted by a decoder 125 (same as the Decoder 1 37, for example of FIG. 1) to a reconstructed dataset 130. The reconstructed dataset 130 may represent a reconstructed, but lossy version of the input dataset 105 since the compressed representation 120 may capture the relevant information, such as the most important features of the input dataset 105 and disregard any extraneous information resulting in lossy compression effects.

Thus, the block diagram of FIG. 2 illustrates the generation of the compressed representation 120 of the input dataset 105, and to reconstruct a lossy representation of the input dataset 105 from the compressed representation 120 that still captures the main features of the input dataset 105. Faster mathematical operations may then be performed on the compressed representation 120 instead of being performed on the input dataset 105 so as to enhance computational efficiency of the computing device1 35 since the compressed representation 120 is a smaller data representation of the input dataset 105.

Databases of large entities such as financial institutions, for example, may store datasets of structured and unstructured data in memories and/or storage devices located in multiple computing devices such as the Q computing devices as shown in FIG. 1. These big-data financial databases may have data volumes up to hundreds of terabytes or even petabytes storing not only customer financial account and/or transaction data, but also data in datasets used for predicting customer behavior used, for example, in creating strategies for the financial instruction.

Consider the following exemplary embodiment which is shown to merely provide conceptual clarity and is not by way of limitation of the embodiments disclosed herein. The input dataset 105 may be a sample dataset of 2000 data samples taken from or related to a much larger dataset, such as Datasetn 49 that may be stored somewhere in the database1 46 unknown to the user 15. The user 15 may wish to search databases (e.g., the database1 46, . . . the databaseQ 73) over all of the Q computing devices. The processor1 40 may have to search for the 2000 samples in 100 terabytes or petabytes of data to locate the larger dataset in the database1 46 from which the 2000 samples were taken. The search to find the parent datasets in the Q Databases over the sample dataset may be very time consuming and/or very inefficient.

The embodiments disclosed herein provide a technical solution to significantly improve the computational efficiency in a quick search using the sample dataset based on the compressed representations. First, the sample dataset may be encoded by encoder1 36 to a compressed representation, such as a latent representation. Second, each of the datasets in the database may be encoded for example by encoder1 36 into a compressed representation, such as a latent representation, and stored in an index representation database in the compressed representation. The Processor1 46 may then use the compressed representations of the original datasets in the Q index representation databases to locate the uncompressed datasets in the Q databases by comparing a distance metric of the compressed representation of the sample dataset with a distance metric for each of the compressed representations for each of the plurality of compressed datasets to locate a subset of datasets having a distance metric lower than a predefined value.

In some embodiments, the input dataset 105 may include text-based dataset. The encoder 110 may encode the text-based input dataset to a compressed representation utilizing a semantic closeness based on their context of occurrence.

In some embodiments, the encoder 110 may use a word2vec algorithm which is a word embedding algorithm that uses a neural network model to learn word associations from a large corpus of text. For example, words may be represented as numbers and sentences by a vector of numbers. In other embodiments, the encoder 110 may use a column2vec algorithm.

In some embodiments, the number for a word may be the entry number of the word in a dictionary. For example, the word "float" may appear as the 10,000th word in the dictionary and the numerical value for "float" may be assigned as 10,000.

In some embodiments, consider a vector of words ['I', 'like', 'to', 'hotel', 'hostel', 'sleep']. The sentence "I like hotels" may be mapped to the vector [1,1,0,1,0,0] and "I like hostels" may be mapped to [1,1,0,0,1,0] where the value "1" denotes the number of instances or occurrences in the sentence. Note that both sentences are nearly equivalent but may be mapped to very different locations in 6-dimensional space. This approach may be applied to large text-based datasets, for example.

In some embodiments, in the same manner as described above, n-words, or n unique words may be found in m-text-based data objects. To represent the word embeddings, an n×m matrix also known as an occurrence matrix may be used as the input dataset 105. The occurrence matrix may be formed from the m-text-based data objects such as a document and/or text file. Each column of the occurrence matrix may correspond to a particular text-based data object from the m text-based data objects and the each of the n-rows may refer to a particular word from the n-words found in the plurality of text-based data objects, for example. The value of each matrix element may be the number of occurrences of a particular word in a particular text-based data object, or a weight related to the number occurrences of a particular text-based data object. In other embodiments, the rows may be documents and the columns may represent the words.

In some embodiments, the encoder 110 may use as its input, the input dataset 105 comprising m columns of data objects and the n rows may be features in the data objects which may be used to generate the n×m matrix from the plurality of data objects. The column vector of a data object may also be referred to as an index representation. The n×m matrix may have N dimensions, where N is an integer. The input dataset 105 may include data objects from any combination of text-based data objects, image-based data objects, and/or any suitable abstract data-types that may include a group of key identifiers and an associated set of values (e.g., key-value pairs). The input dataset 105 may be a CSV file, for example, such as a large spreadsheet.

In some embodiments, the input dataset 105 may include a plurality of image data objects where the images may include pictures and/or video frames. The input dataset 105 may include, for example, a high dimensional pixel space representation of the images. The processor1 40, for example, may generate an n×m matrix that may include m column vectors with the plurality of image data objects where each row in the column vector may be related to a pixel value.

In some embodiments, when the user 15 may initiate a quick search of the plurality of datasets (e.g., the n datasets denoted as Datasetn 49) stored in a database such as the Database1 49 based on a sample dataset. The plurality of datasets may be too large to search. In the embodiments disclosed herein, the Encoder 110 may use two steps to 1) convert the dataset to an n×m matrix representation and then 2) input the n×m matrix representation to a machine learning model (e.g., part of the encoder 110) configured to generate the compressed representation 120 of the input dataset 105. The encoder 110 may be configured to further decompose the n×m matrix into lower dimensional matrices as described hereinbelow.

The matrix representation of a dataset may be referred to herein as a mapping of a plurality of index representations. The matrix representation may be further compressed to a compressed representation by the encoder.

In some embodiments, the machine learning model may include a number of algorithms to generate the compressed representation. These encoder algorithms may include, for example, a non-negative matrix factorization (NMF), a principal component analysis (PCA), independent component analysis (ICA), an auto-encoder, and/or a latent space representation generator.

In some embodiments, the net effect of these algorithms may be to reduce the matrix rank or dimension of the n×m matrix representation of the dataset and to identify features and/or principle components in the datasets.

In some embodiments, the features may be specific words in a text-based data object, an identified object found in an image-based data object such as a coffee mug, shape of the coffee mug, etc., and/or a measurable piece of data (e.g., matrix element values) that may be used for analysis after encoding.

In some embodiments, features may be extracted from the pixel data of an image such as the value of a handwritten number in a dataset taken from the Modified National Institute of Standards and Technology (MNIST) database dataset, for example. The MNIST database is a large database of handwritten digits that may be used for training various image processing systems.

In some embodiments, the image based data objects represented by high-dimensional pixel data may be encoded to a compressed representation, such as a latent space representation, with the encoder 110 implementing using a T-distributed stochastic neighbor embedding (t-SNE) machine learning algorithm. The t-SNE algorithm may capture features in the image data objects to reduce the high-dimensional pixel data to a low dimensional space.

In some embodiments, for the case of text-based data objects, the encoder 110 may reduce the rank of the occurrence matrix as previous described. The input dataset 105 that may include the text-based data objects may be too large due to synonymy. Rank lowering may be performed by identifying synonymy and combining words that have similar meanings, for example.

In some embodiments, the encoder 110 may use a matrix decomposition of the n×m matrix representation of the dataset or from higher order matrix representation of a compressed state to generate the compressed representation 120 of the input dataset 105. The compressed representation 120 after matrix decomposition may include low order matrices such as 1×3 or 2×2 matrices, for example) corresponding to different features derived from the n×m matrix representation of the dataset.

In some embodiments, these low order representations may enable a visual representation of the different features in a given dataset. Thus, using these low order, latent space representations of the different features, the processor1 40 may identify the same or similar features in a plurality of data objects in the dataset and may cluster the same or similar features into groups or clusters that may be shown 2-dimensional (2D) or 3-dimensional (3D) visual representations.

In some embodiments, any matrix decompositions, compressed representations, and the n×m matrix representation of the dataset for each dataset in a plurality of datasets performed by the Processor 1 36 may be stored as N compressed datasets (e.g. the Comp Dataset1 51, the Comp Dataset2 52, . . . , the Comp DatasetN 53) in the Index Representation Database1 50 which may be indexed to each the respective datasets in the Database1 46 (e.g., the Dataset1 47, the Dataset2 48, . . . , the DatasetN 49).

In some embodiments, a first vector from the origin of the 2D or 3D representation to a particular cluster may define a location in the mapping (e.g., the original or decomposed n×m matrix). The second vector from the origin to a feature element mapped onto the 2D or 3D representation may be defined. The distance between the first and the second vector used to characterize feature similarity between the feature element and the cluster, for example.

In some embodiments, the encoder 110 may use matrix decomposition that is configured to reduce gaps between clusters without any feature elements so as to increase computational efficiency.

Although the cluster may be visualized in 2D and/or 3D representations after matrix decomposition of the n×m matrix representation of the dataset, the cluster may be defined in any dimension. Furthermore, the distance between a cluster and any feature to determine the distance between the first and second vectors n×m space may also be computed in any dimension of the compressed representation for determining feature similarity.

In some embodiments, the Processor1 40 may generate a mapping of the plurality of index representations, wherein the mapping may include a matrix of N dimensions.

In some embodiments, the Processor1 40 may determine that the at least one of the plurality of datasets is most similar to the sample dataset further by determining a location in the mapping for the sample dataset representation.

In some embodiments, the Processor1 40 may determine that the at least one of the plurality of datasets is most similar to the sample dataset based on a distance between the location in the mapping for the sample dataset representation and locations of the plurality of index representations within the matrix.

In some embodiments, the Processor1 40 may perform a matrix decomposition process on the mapping to reduce the matrix of N dimensions to a decomposed matrix having fewer dimensions than the matrix of N dimensions.

In some embodiments, the Processor1 40 may perform the matrix decomposition process on the sample dataset representation to generate a decomposed sample dataset representation.

In some embodiments, the Processor1 40 may determine that the at least one of the plurality of datasets is most similar to the sample dataset by determining a location in the decomposed matrix for the decomposed sample dataset representation.

In some embodiments, the Processor1 40 may determine that the at least one of the plurality of datasets is most similar to the sample dataset is based on a distance between the location in the decomposed matrix for the decomposed sample dataset representation and locations of the plurality of index representations within the decomposed matrix.

In some embodiments, the Processor1 40 may determine that the at least one of the plurality of datasets is most similar to the sample dataset by determining a group of the plurality of index representations within the decomposed matrix that represent a cluster around the location in the decomposed matrix for the decomposed sample dataset representation, and selecting the at least one of the plurality of datasets that is most similar to the sample dataset based on a comparison of each of the group of the plurality of index representations within the matrix to the sample dataset representation.

In some embodiments, the Processor1 40 may not compare in the comparison, those of the plurality of datasets within the matrix that are not determined to be part of the group of the plurality of index representations within the decomposed matrix that represent the cluster around the location in the decomposed matrix for the decomposed sample dataset representation.

In some embodiments, the Processor1 40 may generate the plurality of index representations by performing a non-negative matrix factorization (NMF) process, a principal component analysis (PCA), independent component analysis (ICA), a document embedding, or a process for generating a latent space representation using an autoencoder on each of the plurality datasets.

Figure 3:
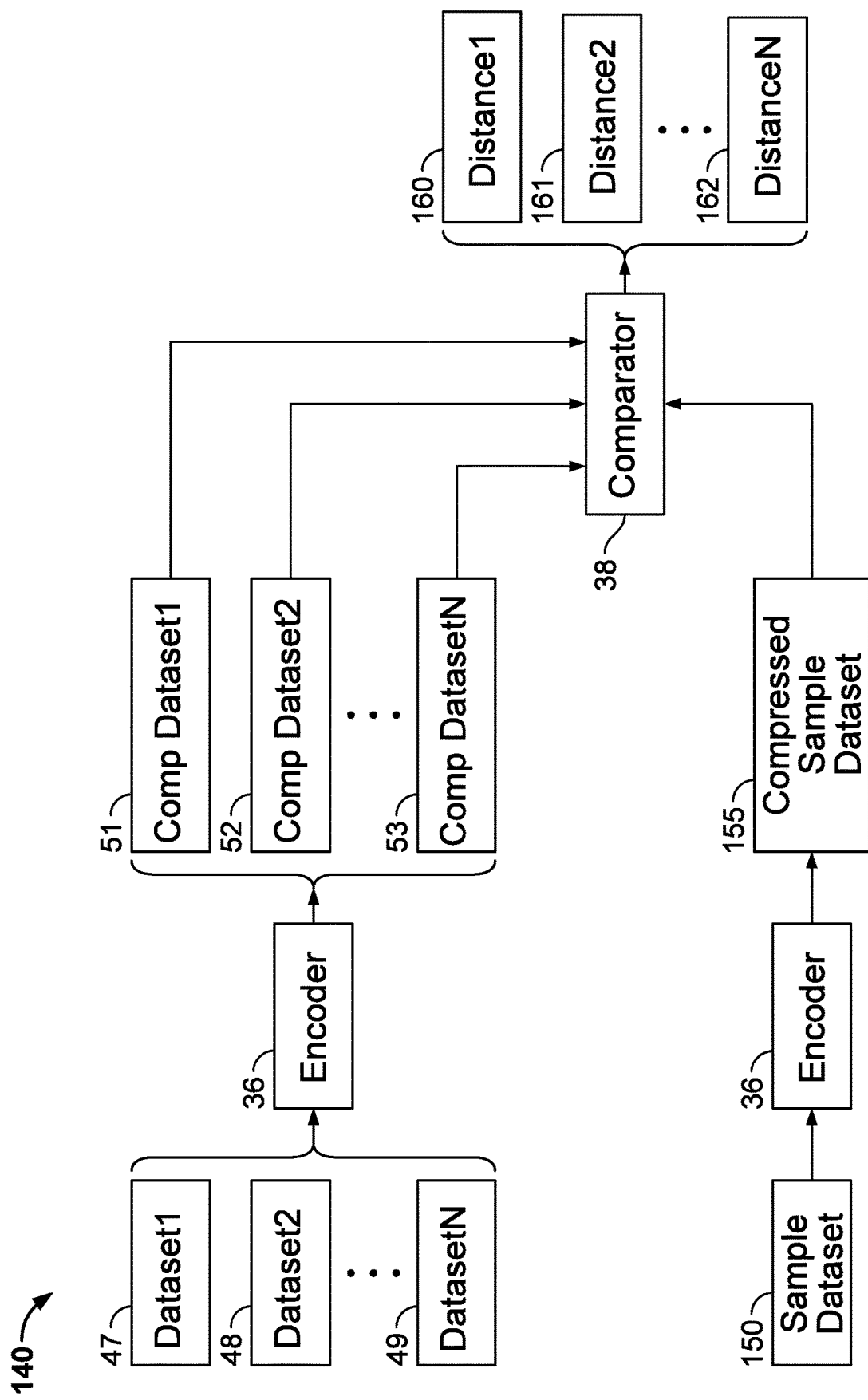
FIG. 3 depicts a block diagram of a system for comparing compressed representations of a sample dataset with a plurality of compressed datasets in accordance with one or more embodiments of the present disclosure.

FIG. 3 depicts a block diagram 140 of a system for comparing compressed representations of a sample dataset with a plurality of compressed datasets in accordance with one or more embodiments of the present disclosure. The user 15 may wish to perform a quick search of the plurality of datasets (e.g., the n datasets denoted as Datasetn 49) stored in the database such as Database1 49 based on a sample dataset 150 for determining possible datasets that the sample dataset may have been taken from or related to. The sample dataset 150 may be inputted to the Encoder 36 which generates a compressed sample dataset 155.

In some embodiments, a comparator 38 may compute a distance comparison between the N compressed datasets (e.g, the Comp Dataset1 51, the Comp Dataset2 52, . . . , the Comp DatasetN 53) represented by lower order matrices generated by matrix decomposition to the a compressed sample dataset 155.

In some embodiments, the comparator may search for features, principle components, and/or latent space using any derived matrices from the n×m matrix representation of the dataset for a distance comparison with the compressed sample dataset 155. The comparator 38 may output a plurality of distances and/or distance comparison metrics denoted Distance1 160, Distance2 161, . . . , DistanceN 162, representing, for example, the distance between feature clusters in each of the compressed datasets to the compressed sample dataset 155 in latent space representation.

In some embodiments, the comparator 38 may determine dataset similarity with the sample dataset 150 by computing the distance between locations in latent space using any suitable distance metrics such as a Euclidean distance, a Manhattan distance, a Levenshtein distance, a cosine similarity, and/or any suitable weight and space calculation, for example.

Figure 4:
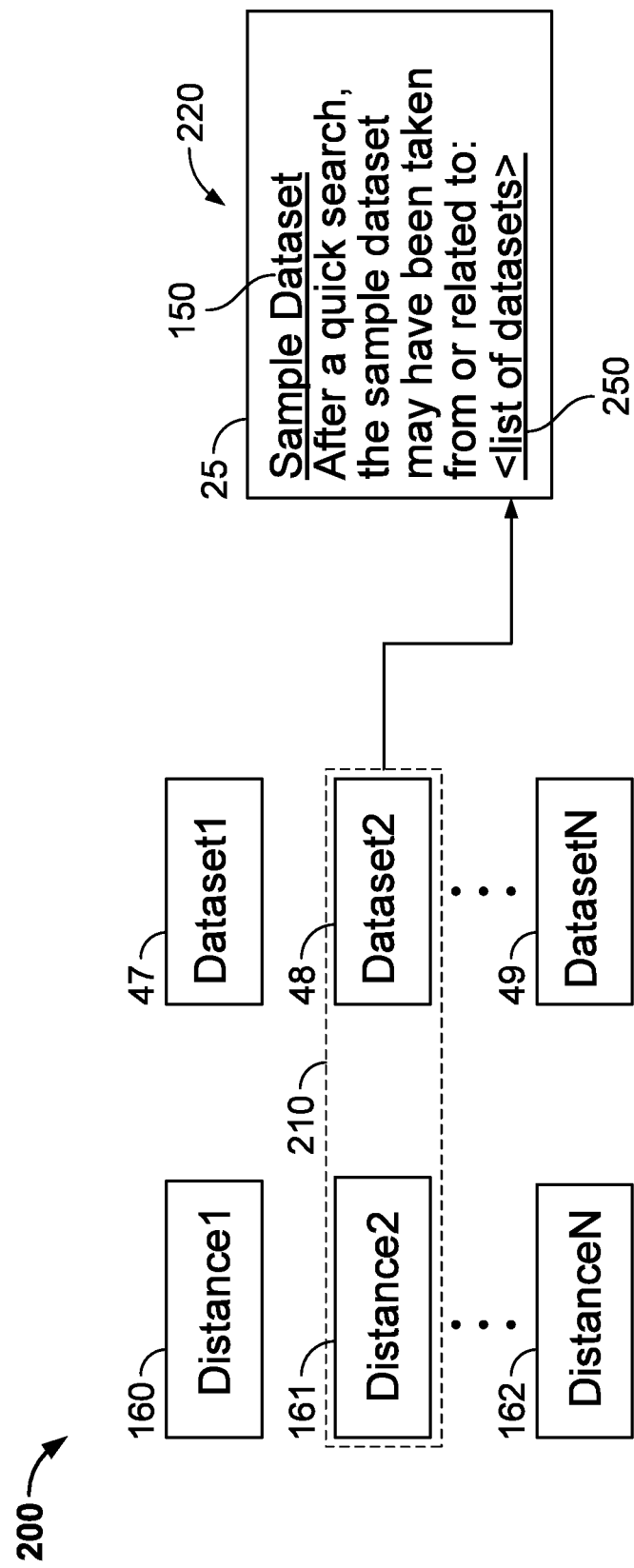
FIG. 4 depicts a diagram illustrating a method for identifying datasets from a plurality of datasets related to a sample dataset in accordance with one or more embodiments of the present disclosure.

FIG. 4 depicts a diagram 200 illustrating a method for identifying datasets from a plurality of datasets related to the sample dataset 150 in accordance with one or more embodiments of the present disclosure. The comparator 38 may identify a subset of datasets from the plurality of the dataset when the computed distance is less than a predefined threshold distance such as Distance2 161 for Dataset2 48 as shown in the rectangular dotted box 210, for example. The subsets may be identified by the indexing between the N datasets and the N compressed datasets in the Database1 46 and the Index Representation Database 1 50. In other embodiments, the subset of datasets from the plurality of the dataset may be determined by a predefined number of closest distance results.

In some embodiments, the GUI 25 may display a message 220 to the user 15 on the display of the computer 20 associated with the user 15. The message may include a listing of the sample dataset 150 with a message that "After a Quick Search, the sample dataset may have been taken from or related to:" and a display of a list 250 of the datasets in the subset based on the computed distance.

Figure 5:
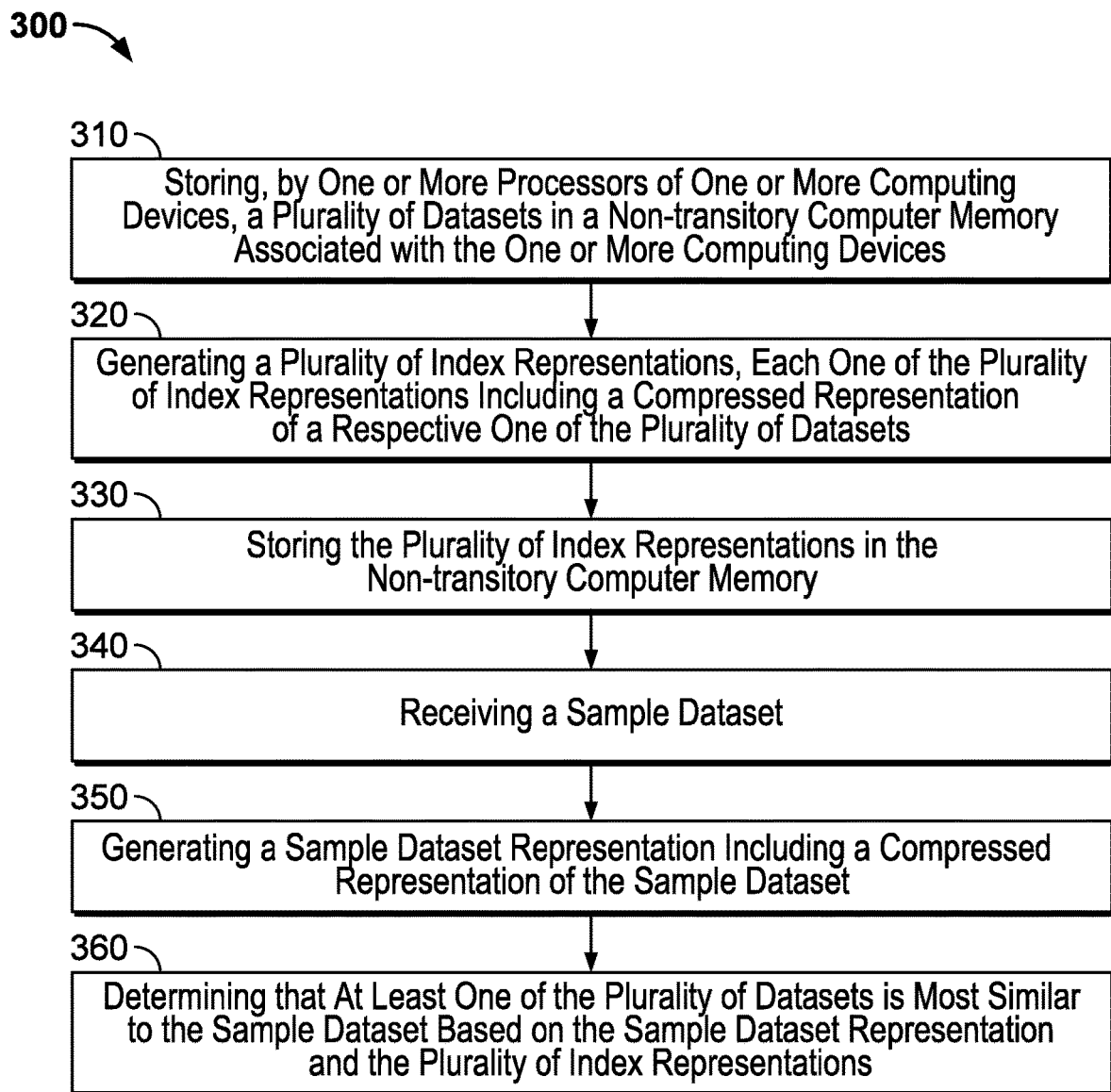
FIG. 5 is a flowchart illustrating a method for implementing a fast dataset search using a compressed representation of a plurality of datasets.

FIG. 5 is a flowchart illustrating a method 300 for implementing a fast dataset search using a latent space representation of a plurality of datasets. The method 300 may be performed by the processor1 40 of the computing device1 35, for example, or by the processor of any of the Q computing devices.

In some embodiments, the method 300 may include storing 310 a plurality of datasets in a non-transitory computer memory associated with the one or more computing devices.

In some embodiments, the method 300 may include generating 320 a plurality of index representations, each one of the plurality of index representations including a compressed representation of a respective one of the plurality of datasets.

In some embodiments, the method 300 may include storing 330 the plurality of index representations in the non-transitory computer memory.

In some embodiments, the method 300 may include receiving 340 a sample dataset.

In some embodiments, the method 300 may include generating 350 a sample dataset representation including a compressed representation of the sample dataset.

In some embodiments, the method 300 may include determining 360 that at least one of the plurality of datasets is most similar to the sample dataset based on the sample dataset representation and the plurality of index representations.

In some embodiments, exemplary inventive, specially programmed computing systems/platforms with associated devices (e.g., any of the Q computing devices, such as the computing deviceQ 70 and/or the computer 20 associated with the user 15) are configured (e.g., via the communication circuitry and interface to communicate 32 over the communication network 30) to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors (e.g., any of the Q computing devices, such as the computing deviceQ 70 and/or the computer 20 associated with the user 15). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software such as any of the Q computing devices, such as the computing deviceQ 70 and/or the computer 20 associated with the user 15. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium in the memory 1 45, . . . , the memory Q 72 and/or the memory 17 which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure (e.g., any of the Q computing devices, such as the computing deviceQ 70 and/or the computer 20 associated with the user 15) may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. Any of the Q computing devices such as the computing deviceQ 70 may be a server. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure (e.g., any of the Q computing devices, such as the computing deviceQ 70 and/or the computer 20 associated with the user 15) may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure (e.g., any of the Q computing devices, such as the computing deviceQ 70 and/or the computer 20 associated with the user 15) may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users as represented by the user 15 shown in FIG. 1 that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure (e.g., any of the Q computing devices, such as the computing deviceQ 70 and/or the computer 20 associated with the user 15) may be configured to output to distinct, specifically programmed graphical user interface (e.g., GUI 25) implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, such as the computer 20 may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device. [95] As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user) such as the system 10 shown in FIG. 1, for example.

In some embodiments, the exemplary inventive computer-based systems/platforms, the exemplary inventive computer-based devices, and/or the exemplary inventive computer-based components of the present disclosure (e.g., any of the Q computing devices, such as the computing deviceQ 70 and/or the computer 20 associated with the user 15) may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
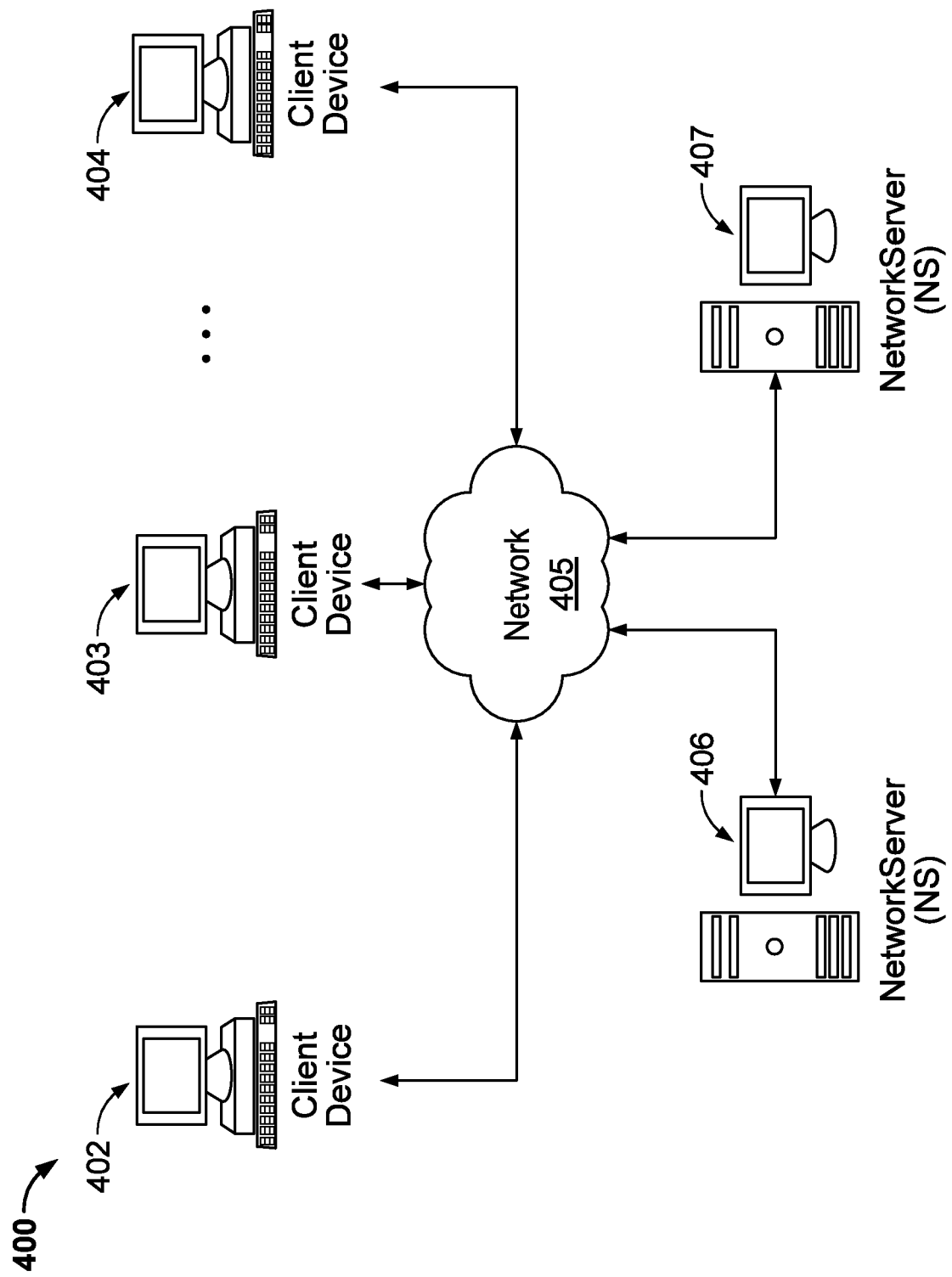
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes (e.g., the communication network 30) such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
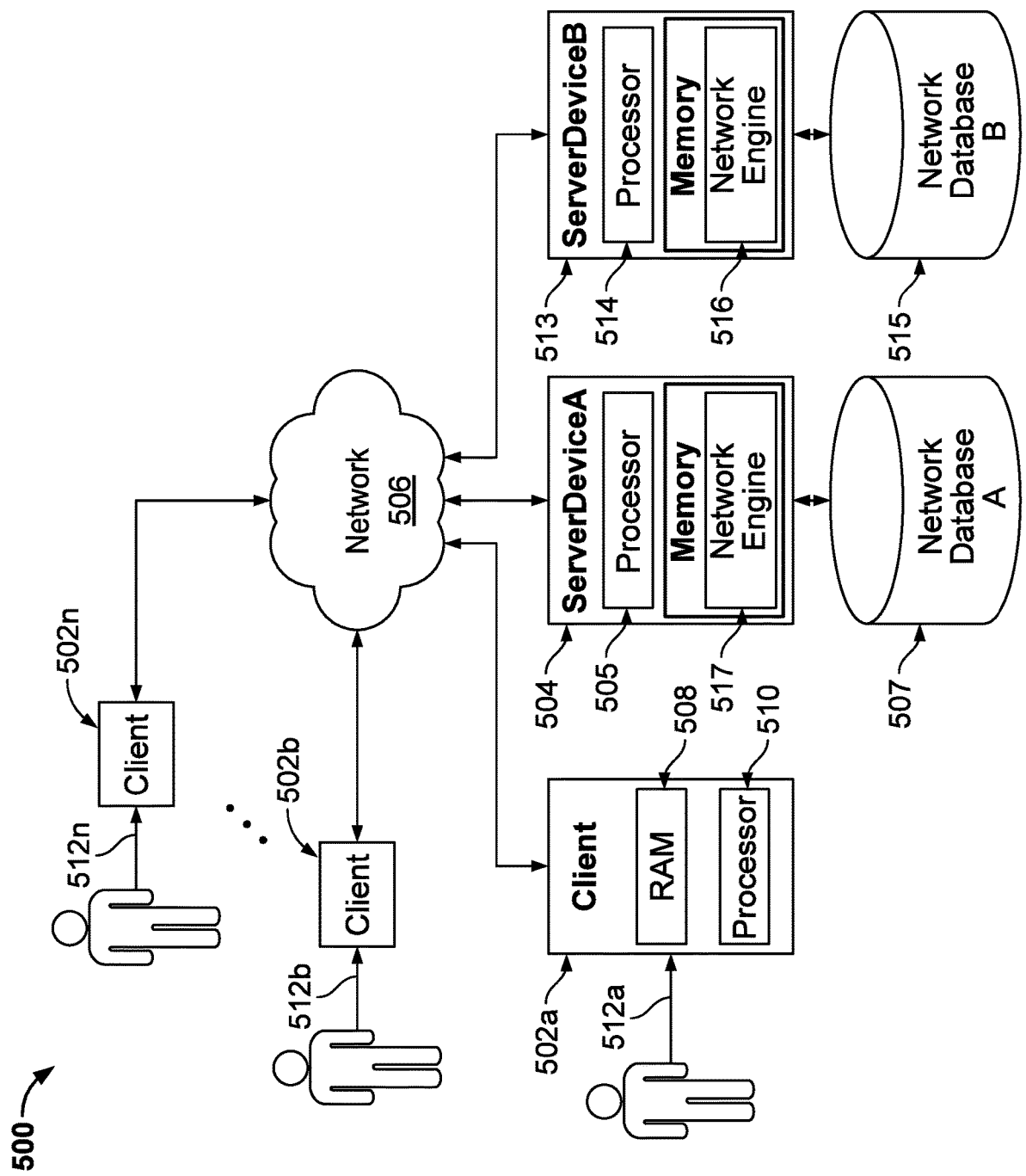
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™ Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502*a* through 502*n* may be mobile clients.

In some embodiments, at least one database of exemplary databases 507 and 515 may be any type of database such as the databases stored in Memory1 45, for example, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database such as the databases stored in Memory1 45, for example, may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
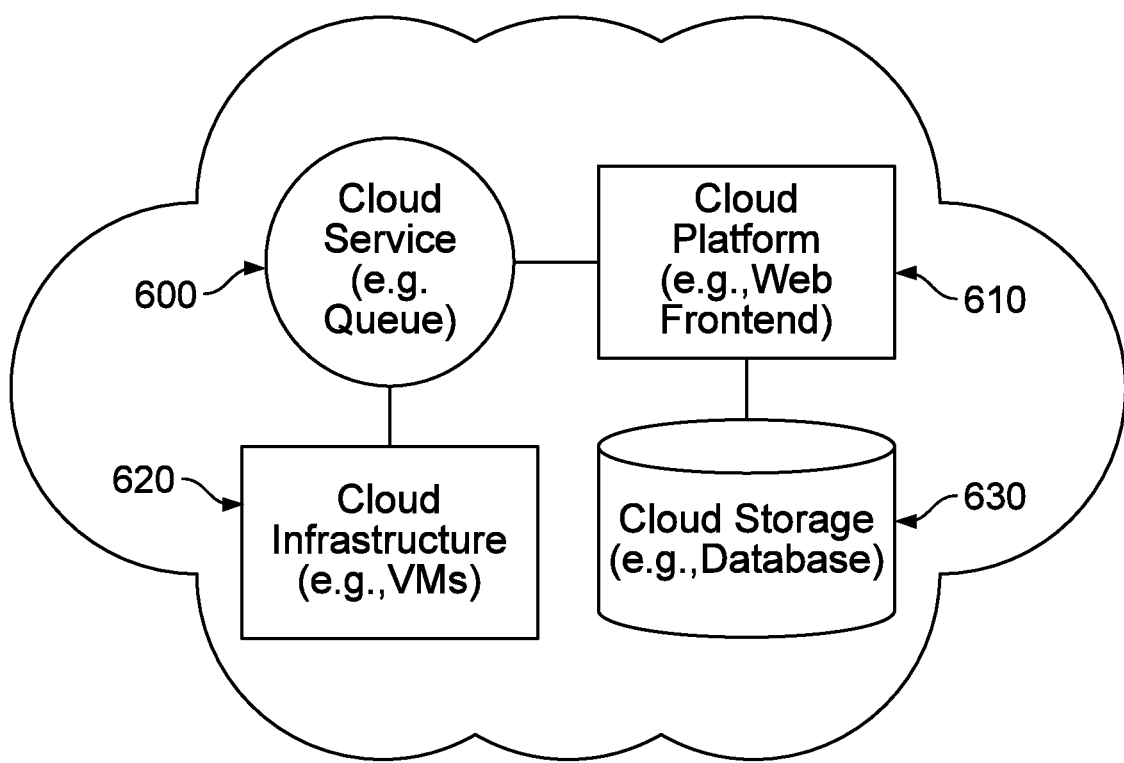
FIGS. 8 and 9 are diagrams illustrating implementations of cloud computing architecture/aspects with respect to which the disclosed technology may be specifically configured to operate, in accordance with one or more embodiments of the present disclosure.
Figure 9:
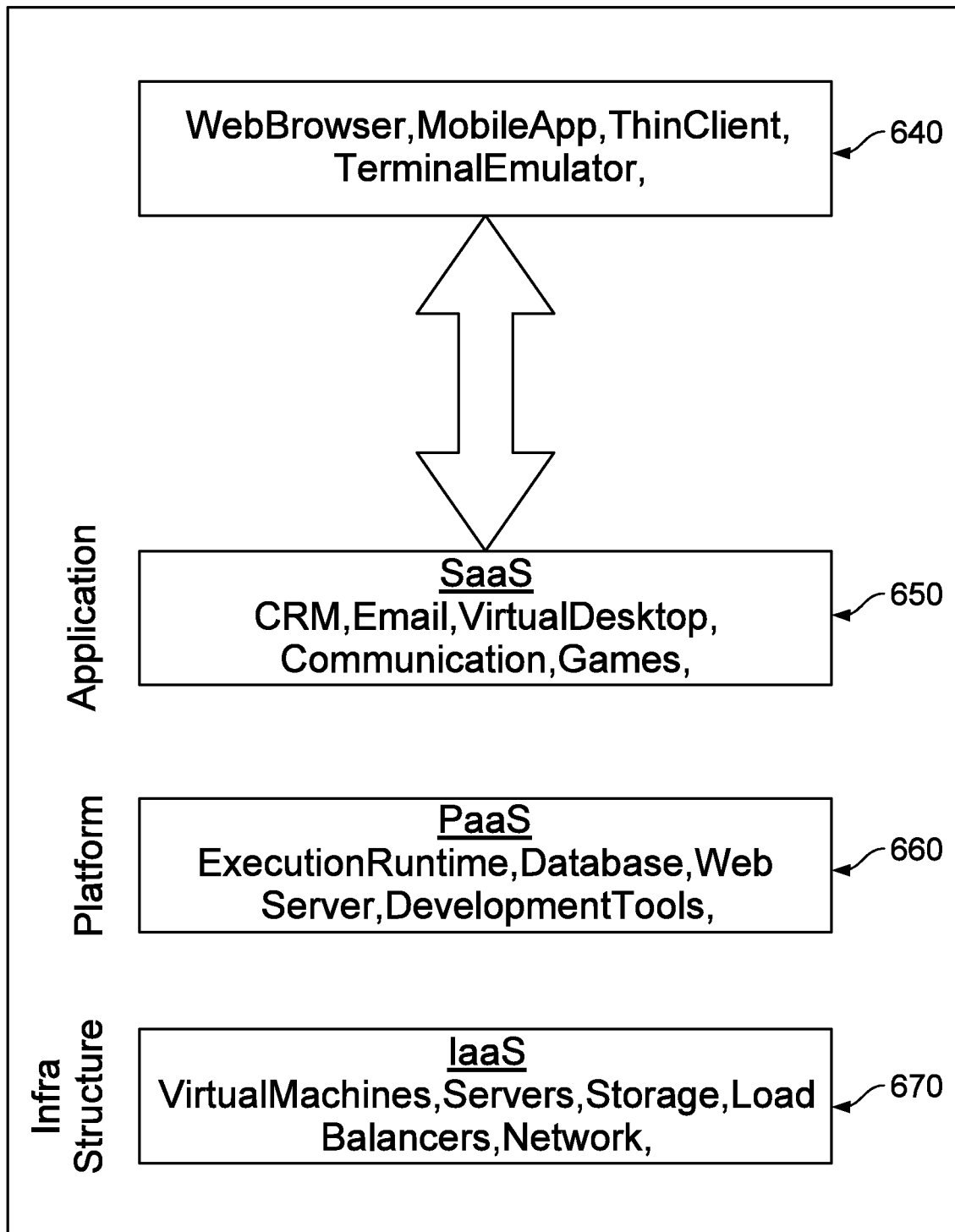

FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. The cloud computing/architecture(s) of FIG. 8 may include, for example, a cloud service 600, a cloud platform 610, a cloud infrastructure 620, and a cloud storage 630.

In some embodiments, the exemplary inventive computer-based systems/platforms, the exemplary inventive computer-based devices, and/or the exemplary inventive computer-based components of the present disclosure may be specifically configured to operate in an cloud computing/architecture with WebBrowser, NobileApp, ThinClient, and Terminal Emulater 640 such as, but not limiting to: infrastructure a service (IaaS) 670, platform as a service (PaaS) 650, and/or software as a service (SaaS) 650 as shown in FIG. 9.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. For example, any of the Q encoders, decoders, and/or comparators such as the encoder 1 36, the decoder 1 37 and/or the comparator 38 of FIG. 1 may be implemented using AI/machine learning techniques. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
   ii) Transfer the input data to the exemplary neural network model,
   iii) Train the exemplary model incrementally,
   iv) determine the accuracy for a specific number of timesteps,
   v) apply the exemplary trained model to process the newly-received input data,
   vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
   storing, by one or more processors of one or more computing devices, a plurality of datasets in a non-transitory computer memory associated with the one or more computing devices;
   generating, by the one or more processors, a plurality of index representations, each one of the plurality of index representations that may include a compressed representation of a respective one of the plurality of datasets;
   storing, by the one or more processors, the plurality of index representations in the non-transitory computer memory;
   receiving, by the one or more processors, a sample dataset;
   generating, by the one or more processors, a sample dataset representation that may include a compressed representation of the sample dataset; and
   determining, by the one or more processors, that at least one of the plurality of datasets is most similar to the sample dataset based on the sample dataset representation and the plurality of index representations.

2. The method of clause 1, may further include generating, by the one or more processors, a mapping of the plurality of index representations, where the mapping may include a matrix of N dimensions.

3. The method of clause 2, where the determining that the at least one of the plurality of datasets is most similar to the sample dataset may further include determining a location in the mapping for the sample dataset representation.

4. The method of clause 3, where the determining that the at least one of the plurality of datasets is most similar to the sample dataset is based on a distance between the location in the mapping for the sample dataset representation and locations of the plurality of index representations within the matrix.

5. The method of clause 2, may further include storing, by the one or more processors, the mapping in the non-transitory computer memory.

6. The method of clause 2, may further include performing, by the one or more processors, a matrix decomposition process on the mapping to reduce the matrix of N dimensions to a decomposed matrix having fewer dimensions than the matrix of N dimensions.

7. The method of clause 6, may further include storing, by the one or more processors, the decomposed matrix in the non-transitory computer memory.

8. The method of clause 6, may further include performing, by the one or more processors, the matrix decomposition process on the sample dataset representation to generate a decomposed sample dataset representation.

9. The method of clause 8, where the determining that the at least one of the plurality of datasets is most similar to the sample dataset may further include determining a location in the decomposed matrix for the decomposed sample dataset representation.

10. The method of clause 9, where the determining that the at least one of the plurality of datasets is most similar to the sample dataset may be based on a distance between the location in the decomposed matrix for the decomposed sample dataset representation and locations of the plurality of index representations within the decomposed matrix.

11. The method of clause 9, where the determining that the at least one of the plurality of datasets is most similar to the sample dataset may include:
   determining a group of the plurality of index representations within the decomposed matrix that represent a cluster around the location in the decomposed matrix for the decomposed sample dataset representation; and
   selecting the at least one of the plurality of datasets that is most similar to the sample dataset based on a comparison of each of the group of the plurality of index representations within the matrix to the sample dataset representation.

12. The method of clause 11, where the comparison does not compare those of the plurality of datasets within the matrix that are not determined to be part of the group of the plurality of index representations within the decomposed matrix that represent the cluster around the location in the decomposed matrix for the decomposed sample dataset representation.

13. The method of clause 1, where the generating of the plurality of index representations may include performing a non-negative matrix factorization (NMF) process, a principal component analysis (PCA), independent component analysis (ICA), a document embedding, or a process for generating a latent space representation using an autoencoder on each of the plurality datasets.

14. A system may include:
   a non-transitory computer memory;
   at least one processor coupled to the non-transitory computer memory, the at least one processor may be configured to:
   receive a sample dataset;
   generate a sample dataset representation that may include a compressed representation of the sample dataset; and
   determine that at least one of a plurality of datasets is most similar to the sample dataset based on the sample dataset representation and a plurality of index representations;
   where each one of the plurality of index representations may include a compressed representation of a respective one of the plurality of datasets.

15. The system of clause 14, where the processor may be further configured to generate a mapping of the plurality of index representations, where the mapping may include a matrix of N dimensions.

16. The system of clause 15, where the processor may be further configured to perform a matrix decomposition process on the mapping to reduce the matrix of N dimensions to a decomposed matrix having fewer dimensions than the matrix of N dimensions.

17. The system of clause 16, where:
the determination that the at least one of the plurality of datasets is most similar to the sample dataset further may include determining a location in the decomposed matrix for a decomposed sample dataset representation; and
the determining that the at least one of the plurality of datasets is most similar to the sample dataset is based on a distance between the location in the decomposed matrix for the decomposed sample dataset representation and locations of the plurality of index representations within the decomposed matrix.

18. A non-transitory computer readable medium having instructions stored thereon that, upon execution by a computing device, may cause the computing device to perform operations may include:
receiving a sample dataset from a user device;
generating a sample dataset representation may include a compressed representation of the sample dataset;
determining that a subset of a plurality of datasets is most similar to the sample dataset based on the sample dataset representation and a plurality of index representations;
where each one of the plurality of index representations may include a compressed representation of a respective one of the plurality of datasets; and
transmitting data indicative of the subset of the plurality of datasets to the user device, where the subset of the plurality of datasets are ranked in order of similarity to the sample dataset representation in the data indicative of the subset of the plurality of datasets.

19. The non-transitory computer readable medium of clause 18, where the subset may be determined based on a desired predetermined number of closest results.

20. The non-transitory computer readable medium of clause 18, where the subset may be determined based on a desired threshold of similarity between the plurality of index representations and the sample dataset representation.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
storing, by one or more processors of one or more computing devices, a plurality of datasets in a database in a non-transitory computer memory associated with the one or more computing devices;
transforming, by the one or more processors, using an encoder module, comprising at least one first machine learning model, the plurality of datasets respectively into a plurality of compressed latent space datasets in a latent space representation that groups similar features in data objects in each of the plurality of datasets into feature clusters in the latent space representation;
storing, by the one or more processors, the plurality of compressed latent space datasets in the non-transitory computer memory;
receiving, by the one or more processors, over a communication network, from a graphical user interface (GUI) of a computing device associated with a user, a sample dataset from the plurality of datasets from the user to search for in the database;
wherein the computing device associated with the user is communicatively coupled to the one or more computing devices over the communication network;
transforming, by the one or more processors, using the encoder module, the sample dataset into a sample compressed latent space dataset in the latent space representation;
determining, by the one or more processors, using a comparator module, comprising at least one second machine learning model, a plurality of distances between the sample compressed latent space dataset and each of the plurality of compressed latent space datasets in the latent space representation;
identifying, by the one or more processors, at least one compressed latent space dataset from the plurality of compressed latent space datasets having a distance smaller than a predefined threshold distance;
determining, by the one or more processors, an indexing between the plurality of datasets and the plurality of compressed latent space datasets;
determining, by the one or more processors, at least one possible location of the sample dataset in the database based at least in part on:
the at least one compressed latent space dataset in the latent space representation, and
the indexing; and
instructing, by the one or more processors, over the communication network, the computing device to display on the GUI to the user, the at least one possible location of the sample dataset in the database.

2. The method of claim 1, wherein the storing of the plurality of datasets comprises storing each dataset from the plurality of datasets as an n×m matrix of N dimensions in the non-transitory computer memory;
wherein the n×m matrix comprises m columns of data objects from each dataset and n rows of features of the data objects.

3. The method of claim 2, wherein the transforming of the plurality of datasets comprises performing by the encoder module, a matrix decomposition process on each dataset for:
(i) reducing the n×m matrix of N dimensions to a decomposed matrix having a dimensions smaller than, and
(ii) identifying the similar features in the data objects respectively for the feature clusters in the latent space representation respectively for each compressed latent space dataset;
wherein each compressed latent space dataset in the latent space representation comprises the decomposed matrix.

4. The method according to claim 3, wherein each compressed latent space dataset comprises the decomposed matrix with a lower order dimension of either 2 or 3, and further comprising providing, by the one or more processors, a visual representation of the features of the data objects in each compressed latent space dataset.

5. The method of claim 1, wherein the at least one first machine learning model is trained to execute encoder algorithms on each of the plurality of datasets comprising a non-negative matrix factorization (NMF) process, a principal component analysis (PCA), independent component analysis (ICA), an auto-encoder, or a latent space representation generator; and further comprising transforming, by the one or more processors, the plurality of datasets by applying the at least one first machine learning model to the plurality of datasets.

6. The method according to claim 1, wherein the at least one second machine learning model is a trained machine learning model to determine each of the plurality of distances using a Euclidian distance algorithm, a Manhattan distance algorithm, a Levenshtein distance algorithm, a cosine similarity algorithm, or any combination thereof; and wherein the determining of the plurality of distances comprises determining the plurality of distances using the trained machine learning model.

7. The method according to claim 1, further comprising reconstructing, by the one or more processors, from the plurality of compressed latent space datasets, a lossy representation of the plurality of datasets using a decoder module comprising at least one third machine learning model.

8. The method according to claim 1, wherein the plurality of datasets comprises a plurality of text-based datasets; and wherein the transforming of the plurality of text-based datasets to the plurality of compressed latent space datasets comprises applying a word embedding algorithm to the plurality of text-based datasets.

9. The method according to claim 1, wherein the plurality of datasets comprises a plurality of image-based datasets;
wherein each of the plurality of image-based datasets comprises a high dimensional pixel space representation of image data objects;
wherein the storing of the plurality of image-based datasets in the non-transitory computer memory comprises storing each image-based dataset from the plurality of image-based datasets as an n×m matrix of N dimensions; and
wherein the n×m matrix comprises m columns of data objects from each image-based datasets and n rows of pixel values.

10. The method according to claim 9, wherein the transforming of the plurality of image-based datasets to the plurality of compressed latent space datasets comprises applying a T-distributed stochastic neighbor embedding (t-SNE) machine learning algorithm to the plurality of image-based datasets.

11. A system comprising:
a non-transitory computer memory storing computer code; and
at least one processor, that when executing the computer code, configures the at least one processor to:
store a plurality of datasets in a database in the non-transitory computer memory;
transform using an encoder module, comprising at least one first machine learning model, the plurality of datasets respectively into a plurality of compressed latent space datasets in a latent space representation that groups similar features in data objects in each of the plurality of datasets into feature clusters in the latent space representation;
store the plurality of compressed latent space datasets in the non-transitory computer memory;
receive over a communication network, from a graphical user interface (GUI) of a computing device associated with a user, a sample dataset from the plurality of datasets from the user to search for in the database;
transform using the encoder module, the sample dataset into a sample compressed latent space dataset in the latent space representation;
determine using a comparator module, comprising at least one second machine learning model, a plurality of distances between the sample compressed latent space dataset and each of the plurality of compressed latent space datasets in the latent space representation;
identify at least one compressed latent space dataset from the plurality of compressed latent space datasets having a distance smaller than a predefined threshold distance;
determine an indexing between the plurality of datasets and the plurality of compressed latent space datasets;
determine at least one possible location of the sample dataset in the database based at least in part on:
the at least one compressed latent space dataset in the latent space representation, and
the indexing; and
instruct over the communication network, the computing device to display on the GUI to the user, the at least one possible location of the sample dataset in the database.

12. The system of claim 11, wherein the at least one processor is configured to store the plurality of datasets by storing each dataset from the plurality of datasets as an n×m matrix of N dimensions in the non-transitory memory;
wherein the n×m matrix comprises m columns of data objects from each dataset and n rows of features of the data objects.

13. The system of claim 12, wherein the at least one processor is configured to transform the plurality of datasets by performing by the encoder module, a matrix decomposition process on each dataset to:
(i) reduce the n×m matrix of N dimensions to a decomposed matrix having a dimensions smaller than of N, and
(ii) identify the similar features in the data objects respectively for the feature clusters in the latent space representation respectively for each compressed latent space dataset;
wherein each compressed latent space dataset in the latent space representation comprises the decomposed matrix.

14. The system according to claim 13, wherein each compressed latent space dataset comprises the decomposed matrix with a lower order dimension of either 2 or 3; and wherein the at least one processor is further configured to provide a visual representation of the features of the data objects in each compressed latent space dataset.

15. The system according to claim 11, wherein the at least one second machine learning model is a trained machine learning model to determine each of the plurality of distances using a Euclidian distance algorithm, a Manhattan distance algorithm, a Levenshtein distance algorithm, a cosine similarity algorithm, or any combination thereof; and wherein the at least one processor is configured to determine of the plurality of distances by determining the plurality of distances using the trained machine learning model.

16. The system according to claim 11, wherein the at least one processor is further configured to reconstruct from the plurality of compressed latent space datasets, a lossy representation of the plurality of datasets using a decoder module comprising at least one third machine learning model.

17. The system according to claim 11, wherein the plurality of datasets comprises a plurality of text-based datasets;

and wherein the at least one processor is configured to transform the plurality of text-based datasets to the plurality of compressed latent space datasets by applying a word embedding algorithm to the plurality of text-based datasets.

18. The system according to claim 11, wherein the plurality of datasets comprises a plurality of image-based datasets;
   wherein each of the plurality of image-based datasets comprises a high dimensional pixel space representation of image data objects;
   wherein the at least one processor is configured to store the plurality of image-based datasets in the non-transitory computer memory by storing each image-based dataset from the plurality of image-based datasets as an n×m matrix of N dimensions; and
   wherein the n×m matrix comprises m columns of data objects from each image-based datasets and n rows of pixel values.

19. The system according to claim 18, wherein the at least one processor is configured to transform the plurality of image-based datasets to the plurality of compressed latent space datasets by applying a T-distributed stochastic neighbor embedding (t-SNE) machine learning algorithm to the plurality of image-based datasets.

20. The system according to claim 11, wherein the at least one first machine learning model is trained to execute encoder algorithms on each of the plurality of datasets comprising a non-negative matrix factorization (NMF) process, a principal component analysis (PCA), independent component analysis (ICA), an auto-encoder, or a latent space representation generator; and wherein the at least one processor is configured to transform the plurality of datasets by applying the at least one first machine learning model to the plurality of datasets.

* * * * *